United States Patent [19]

Seymour

[11] 4,104,047
[45] Aug. 1, 1978

[54] SUPPORTING GLASS GRIPPING TONGS DURING GLASS SHEET PROCESSING
[75] Inventor: Samuel L. Seymour, Oakmont, Pa.
[73] Assignee: PPG Industries, Inc., Pittsburgh, Pa.
[21] Appl. No.: 799,411
[22] Filed: May 23, 1977
[51] Int. Cl.² .............................................. C03A 23/02
[52] U.S. Cl. ........................................ 65/273; 65/289; 294/119
[58] Field of Search ................. 65/106, 273, 287, 289; 294/118, 119

[56] References Cited
U.S. PATENT DOCUMENTS

| 2,239,546 | 4/1941 | Black et al. | 65/273 X |
| 2,250,628 | 7/1941 | Forbes | 65/106 |
| 2,252,703 | 8/1941 | DeTailly | 269/74 |
| 2,476,169 | 7/1949 | White et al. | 65/106 |
| 3,008,752 | 11/1961 | Hanneken | 294/118 |
| 3,010,753 | 11/1961 | Russ et al. | 294/118 |
| 3,084,969 | 4/1963 | Davidson et al. | 294/118 |
| 3,089,727 | 5/1963 | Hay, Jr. | 294/118 |
| 3,148,968 | 9/1964 | Cypher et al. | 65/106 |
| 3,290,133 | 12/1966 | Thomas | 65/106 |
| 3,290,136 | 12/1966 | Thomas | 65/275 |
| 3,306,652 | 2/1967 | Harper | 294/82 |
| 3,330,590 | 7/1967 | Sheridan et al. | 294/81 |
| 3,367,764 | 2/1968 | Seymour | 65/291 |
| 3,454,298 | 7/1969 | Bognar | 294/118 |
| 3,565,598 | 2/1971 | Seymour | 65/273 |
| 3,594,145 | 7/1971 | Kay | 65/104 |
| 3,753,673 | 8/1973 | Pickard et al. | 65/106 |
| 3,846,110 | 11/1974 | Burns | 65/289 X |

Primary Examiner—Arthur D. Kellogg
Attorney, Agent, or Firm—Dennis G. Millman; Edward I. Mates

[57] ABSTRACT

Disclosed herein is a system for supporting self-closing tongs specially adapted for gripping thin glass sheets (4.5 millimeters and less) during thermal processing, such as that involved during press bending wherein the glass sheets are brought to a sudden start and a sudden stop that promotes swinging of the tongs and its supported glass. The present invention limits the tong swinging so that the glass sheets can be aligned with small tong receiving notches in press bending molds, thereby improving the conformity of press bent glass sheets to their desired shapes.

5 Claims, 8 Drawing Figures

SUPPORTING GLASS GRIPPING TONGS DURING GLASS SHEET PROCESSING

RELATION TO OTHER APPLICATIONS

This application discloses subject matter related to that disclosed in the following patent applications:

(1) U.S. Ser. No. 758,875 of Samuel L. Seymour, filed Jan. 12, 1977, now U.S. Pat. No. 4,082,530, (2) U.S. Ser. No. 787,826 of George A. Iiams, filed Apr. 15, 1977, now U.S. Pat. No. 4,081,193 and (3) U.S. Ser. No. 788,493 of Samuel L. Seymour, filed Apr. 18, 1977.

BACKGROUND OF THE INVENTION

This invention relates to processing glass sheets and specifically refers to an improved method and apparatus for supporting self-closing tongs that grip thin glass sheets during thermal treatment. Tongs have been used for supporting glass sheets in an essentially vertical plane for thermal treatment by gripping the opposite glass sheet surfaces near their upper edges. The tongs are supported from an overhead rail which extends through thermal treatment apparatus by means of a supporting clevis mounted to a carriage that rides on the rail.

During thermal treatment, the glass sheets are conveyed through a furnace, where they are heated as uniformly as possible to an elevated temperature required for subsequent treatment. In press bending, each sheet in turn is rapidly accelerated from a position slightly upstream of the furnace exit for rapid movement to a press bending station, where the sheet is stopped as rapidly as possible, is engaged by a pair of opposing pressing molds, is disengaged and moved rapidly into a cooling station where the shaped sheet is cooled as rapidly and as uniformly as possible.

Glass gripping tongs have been provided with glass engaging elements as small as possible in order to minimize the localized obstruction to the flow of the quenching fluid. Since glass sheets are heated to substantially the softening point during thermal treatment required for tempering or for certain coating procedures, and since tongs for gripping glass sheets are provided with glass engaging elements that penetrate the heat-softened glass sheet surfaces and mar the latter, particularly when the glass sheets are relatively thin so that they require more intensive heating to arrive at a subsequent treatment station at a temperature suitable for a subsequent treatment, a need has existed for tongs with glass engaging elements that do not penetrate the opposite surfaces of the glass sheet as deeply as the prior art tongs.

Disc-shaped glass engaging elements have been used successfully on glass gripping tongs for thermal treatment of glass sheets of previous commercial thicknesses (at least 4.8 millimeter) with reduced tong marking and penetration. However, the prior art tongs needed larger diameter discs to grip thinner glass sheets properly than the discs provided previously to grip glass sheets of greater thickness. The larger sized discs interfered with the flow of quenching fluid against the glass sheet surfaces in the vicinity of the disc-shaped glass engaging elements. This interference in free flow of quenching fluid caused lower compression stresses in the glass sheets in the vicinity of the glass engaging elements than elsewhere in the cooled glass, thus leading to weak regions.

Glass sheets are usually shaped between a pair of complementary pressing members that require clearances for the glass gripping tongs during the shaping operation. The thinner the glass sheet undergoing shaping, the more critical are the requirements for maximum size of notches or openings in the glass sheet shaping members. When the clearance notches normally provided in press bending molds are too large, the control of the shape of the glass sheets is lost in the vicinity of the notches. This produces glass sheets that do not conform to the specifications established by the customer. Glass sheets that deviate from curvature to a great extent are difficult to install and may have objectionable optical properties.

Thin glass sheets lose more temperature enroute from the furnace exit to the cooling station than thick glass sheets. Hence, there is more incentive to accelerate thin glass sheets as rapidly as possible for rapid transit from the furnace to the shaping station, to stop the glass in minimum time for engagement between the press bending molds at the glass shaping station, and to accelerate the shaped glass as rapidly as possible until the entire area of the shaped glass is aligned with spaced, opposed sets of nozzles through which cooling medium is applied against the opposite surfaces of the shaped glass at the cooling station. Rapid acceleration and stopping causes freely hung tongs and their supported sheets to swing about axes extending through the thickness of the glass sheets undergoing treatment. Consequently, press bending molds of the prior art require relatively large notched portions to receive the tongs when the molds move toward one another during shaping to press bend each glass sheet in turn by engaging the latter between the closed press bending molds. Glass engaging elements for tongs have been reduced in size in the direction of glass sheet movement to reduce the size needed for the notched portions somewhat. However, further reduction in the size of the notched portions was still desirable to improve the control of the shape of glass sheets shaped by press bending, particularly those having thicknesses less than nominal thicknesses of 3/16 inch (4.8 millimeters).

DESCRIPTION OF THE PRIOR ART

Typical prior art patents depict tongs containing pointed members as glass engaging elements. These include Black et al U.S. Pat. Nos. 2,239,546; Forbes 2,250,628; De Tailly 2,252,703; White et al. 2,476,169; Hanneken 3,008,752; Russ et al. 3,010,753 and Bognar 3,454,298. Patents that show systems for supporting a multiplicity of glass sheet supporting tongs include the aforesaid patents to Black et al. Forbes, De Tailly and Russ et al. In additiona, U.S. Pat. Nos. 3,594,145 to Kay and 3,753,673 to Pickard et al. show apparatus for suspending a plurality of tongs that grip glass sheets during press bending. The tongs in these patents are suspended in such a manner as to permit a free pivotal movement of the tongs. In addition, the tongs of the Forbes patent have free horizontal movement in two mutually perpendicular directions. The Russ et al. tongs are suspended from yokes pivoted to cup shaped recesses at the top of a bar. The yoke and suspended tongs are free to pivot a limited angle about one horizontal axis and constrained from pivoting about a horizontal axis normal to said one horizontal axis in the Russ et al patented construction. However, there is no teaching in this patent of correlating the limited distance over which tong pivoting is allowed with the length of a notched portion of a press bending mold.

U.S. Pat. No. 3,089,727 to Hay shows self-closing glass sheet gripping tongs provided with a pair of opposed glass sheet engaging elements in the form of disc-shaped members having smooth, peripheral edge surfaces opposing one another, and carried on the bottom of mutually pivoted lever arms. The smooth peripheral edge surfaces do not penetrate the heat-softened glass sheets as deeply as the pointed glass engaging elements of the patented tongs mentioned in the previous paragraph. Means are provided on each lever arm, preferably in the form of a vertical pin secured to a horizontal arm extending beyond the common pivot pin of the tong arms, to pivot the disc-shaped member freely about the vertical pin or shaft. According to one embodiment of the invention of the Hay patent, the disc-shaped members that engage the glass sheet surfaces have a circular periphery. According to another embodiment of the invention patented by Hay, each of the disc-shaped members that engage the glass may include a relatively flat glass engaging portion.

U.S. patent application Ser. No. 787,826 of George A. Iimas, filed Apr. 15, 1977, and U.S. Pat. application Ser. No. 788,493 of Samuel L. Seymour, filed Apr. 18, 1977, provided further improvements in self-closing tongs for gripping glass sheets. Among these improvements is a modification of the disc-like configuration of the glass engaging elements of the Hay patented tongs to enable the tongs to be received within smaller notches in the upper portion of glass shaping molds so as to minimize the unsupported portion of thin glass sheets during press bending. However, the press bending art still requires notched portions of limited dimensions to control the deviation from desired shape of localized glass sheet portions that face the notched portions of a pair of press bending molds during their shaping. The requirement for small dimensions of notched portions becomes more important in shaping glass sheets of thinner dimension because of the greater tendency of thinner glass to deviate from desired shape in their areas that face the notched portions of the press bending molds. The present invention further reduces the minimum length required for said notched portions below that required to receive freely hung tongs having glass engaging elements of reduced length in the direction of glass sheet movement.

The prior art tongs have been used either singly to grip small glass sheets or in sets to grip large glass sheets in conjunction with press bending apparatus substantially identical to that disclosed in U.S. Pat. No. 3,367,764 to S. L. Seymour, the disclosure of which is hereby incorporated by reference. Since the details of the construction and operation of the overall press bending apparatus may be obtained from that patent, only a brief summary need be set forth here in order to obtain an understanding of the present invention.

In a press bending operation, a sheet of glass G, supported in a vertical orientation by one or more tongs T gripping its upper edge portion, and having been heated to a softened condition suitable for bending during its passage through a tunnel-type furnace, is suddenly accelerated and stopped in a bending position between a pair of opposed press bending molds at a glass sheet shaping station. Each pressing mold is reciprocated in a generally horizontal direction, approximately normal to the plane of the glass sheet. The mold reciprocating path may be tilted slightly upward and inward toward the major glass sheet surfaces. This direction of reciprocating movement is sometimes found advantageous for reducing the pull of the tongs on the glass during pressing, as explained in greater detail in U.S. Pat. No. 3,290,133 of D. L. Thomas.

The press bending apparatus comprises a female shaping mold and a male shaping mold. Each shaping mold is at least equal in area to that of the glass sheet undergoing shaping and includes an outwardly facing, relatively flexible shaping plate having the desired outline and curvature for the glass, the female shaping mold having a shaping plate of concave configuration, and the male shaping mold having a shaping plate of complementary convex configuration. The upper edge of each shaping plate includes a number of notched portions for receiving the tongs T when the press bending molds close. The prior art press bending molds are thus able to control the shape of press bent glass sheets throughout their extent except for their notched portions which do not engage the glass. The glass sheet portions facing the notched portions of the press bending molds are engaged only by the glass engaging elements of the tongs.

SUMMARY OF THE PRESENT INVENTION

The present invention provides further improvements in processing thin glass sheets (having thicknesses of 4.5 millimeters and less). It is particularly suitable for processing glass sheets suspended by one or more tongs and conveyed at a non-uniform speed through various processing stations. These stations include a tunnel-type heating furnace, a shaping station and a cooling station located along an elongated path of travel. The present invention is especially suitable when the non-uniform speed is characterized by sudden starts and stops, particularly a rapid stop at the shaping station where each glass sheet, after being heated to an elevated temperature sufficient for shaping while traversing the furnace, is stopped in a desired position of alignment between press bending molds of complementary shape that move toward one another and engage the opposite major surfaces of the glass sheet to impress their shape on said sheet.

The glass engaging elements of the tongs are constrained in their movement in the direction of the path of glass sheet movement in such a manner that the elements are not able to move in the direction of said path more than three times the thickness of the glass sheets undergoing treatment from the position they occupy when the tongs hang freely. Consequently, the length of the notched portions of the shaping surfaces of the press bending molds in the direction of said path can be limited to slightly more than the length of the glass engaging element of the glass gripping tongs and still avoid misalignment between said elements and said notched portions.

Proper alignment between the glass engaging elements of the tongs and the notched portions of the press bending molds insures proper alignment between the glass sheets and the press bending molds and hence, more precise conformity of the glass sheets to their desired shape. Misalignment between the tongs and the press bending molds not only produces imprecise shaping of the glass sheets, but also results in damage to the tongs and the shaping plates of the press bending molds.

The details of the construction by which at least one tong that grips a glass sheet is supported to limit the ability of all the tongs that grip said glass sheet to swing in the direction of the path of glass sheet movement will be better understood in the light of the description of a preferred embodiment of the present invention and combinations of the preferred embodiment with other prior art apparatus elements that follows.

BRIEF DESCRIPTION OF THE DRAWINGS

In the drawings that form part of a description of the present invention, wherein like reference numbers refer to like structural elements.

DESCRIPTION OF THE PREFERRED EMBODIMENT

In order to appreciate the present invention, this specification will first describe tongs that are used to grip thin glass sheets for press bending, then will describe an embodiment of a tongs-supporting system of this invention of supporting a series of tongs T, and finally will describe a press bending apparatus B used with the tongs and tongs supporting carriage C of a tongs-support system and their interrelation to one another.

TONGS CONSTRUCTION

The preferred embodiments of tong T for use in the present invention have glass engaging elements that have a short dimension in the direction of the path of glass sheet movement, a convexly rounded glass engaging surface portion and means for orienting the glass engaging elements relative to the major surfaces of the gripped glass sheets so that the convexly rounded surface portion engages the glass and their short dimension is parallel to the path of glass movements.

Figure 1:
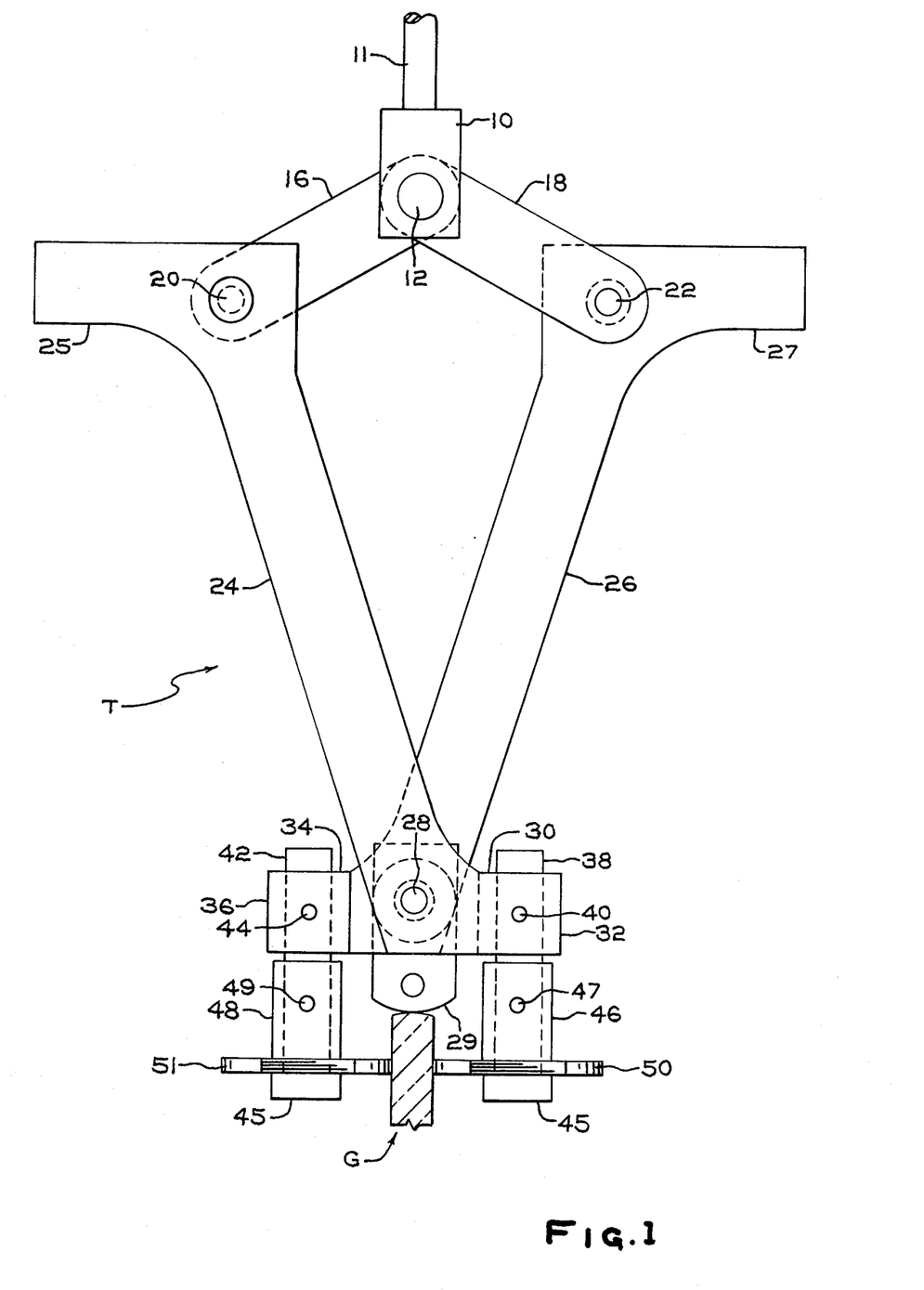
FIG. 1 is a detailed, frontal view of tongs that are typical of those used to press bend glass sheets according to the teaching of the present invention.
Figure 6:
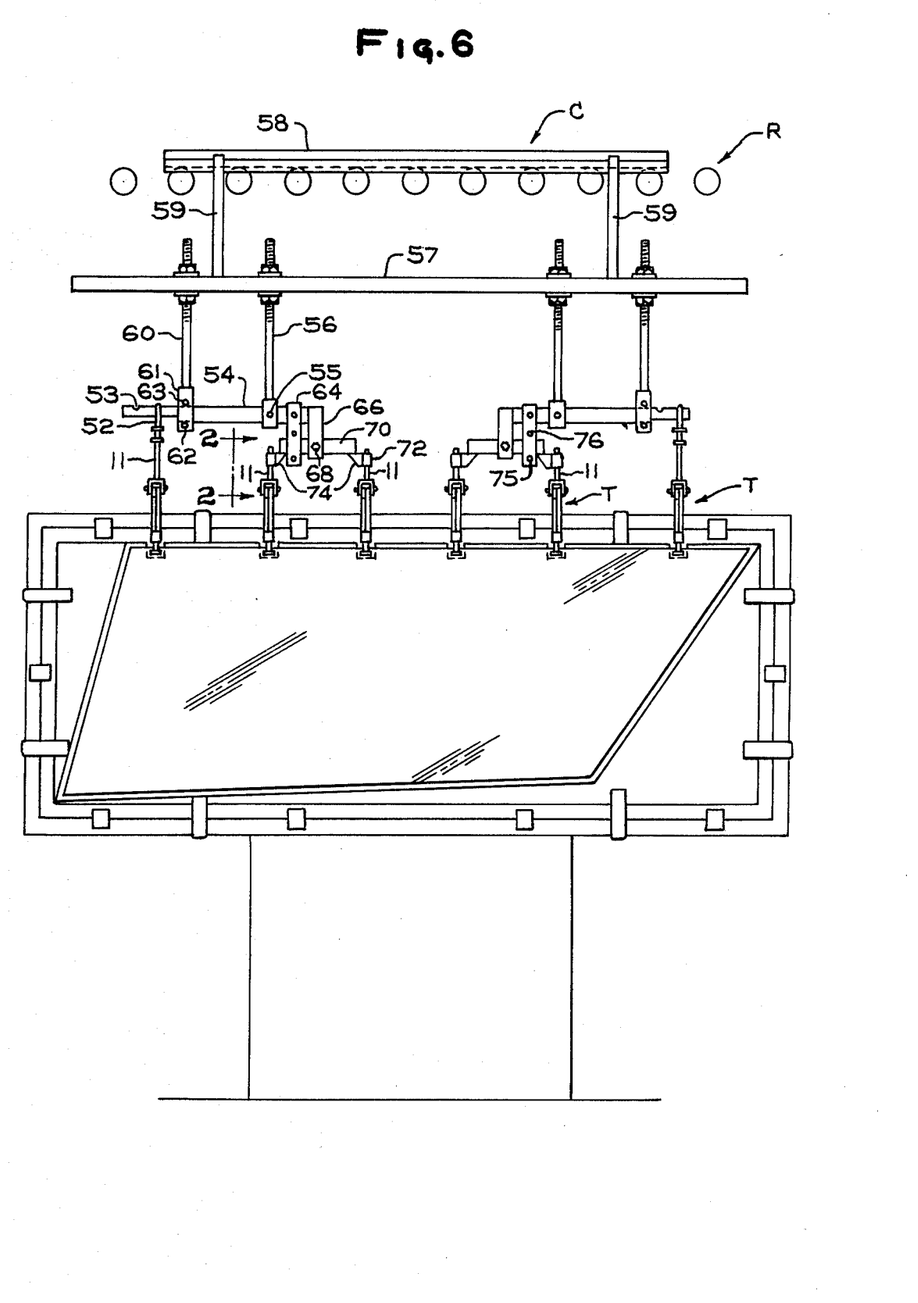
FIG. 6 is a frontal view of a tong supporting system including a tong supporting carriage supporting several glass gripping tongs, showing how thin glass sheets of comparatively large dimensions are supported by tongs, which in turn are supported from said carriage by tong supporting system, including some tongs rigidly supported by a tong support system of the first embodiment of FIGS. 2 and 3 and other tongs supported in freely pivotable relation by a tong support system of the second embodiment depicted in FIGS. 4 and 5.

Referring to FIG. 1 of the drawings, reference number 10 refers to an apertured clevis connected by a vertically extending connecting rod 11 to the carriage C (shown in FIG. 6). The carriage C is movably supported for movement along a roller-type conveyor R, which extends through a heating furnace (not shown), a press bending station B, and a fluid imparting apparatus, (not shown). The latter may be either a cooling station for tempering apparatus or a fluid spraying station for apparatus imparting a coating to the glass surface. Since the heating furnace and the cooling or spraying station are not part of the present invention, they will not be described in detail. Suffice it to say that the heating furnace is upstream of press bending station B and the cooling or spraying station are located downstream of said press bending station B along a path of glass sheet movement defined by the roller conveyor R.

Tongs T comprise a tong support pin 12 which is carried by the aperture in clevis 10. A pair of upper links 16 and 18 is pivoted to tong support pin 12 at their upper ends. At their bottom ends, links 16 and 18 carry one of a pair of link pins 20 and 22. Tong arms 24 and 26 are apertured at their upper portions to receive one or the other of the link pins 20 and 22. Link pin 20 pivotally attaches the upper portion of tong arm 24 to the lower portion of upper link 16, whereas link pin 22 pivotally secures the lower portion of upper link 18 to the upper portion of tong arm 26.

Tong arm 24 has a horizontally extending finger 25 and tong arm 26 has a horizontally extending finger 27 for use in automatically unloading glass sheets from the tongs. Details of this unloading feature are recited in U.S. Pat. No. 3,084,969 to Davidson and Mitchell, the description of which is incorporated herein by reference.

A common hinge pin 28 pivotally secures tong arms 24 and 26 to each other at their lower portions. In addition, an apertured stop member 29 having a convexly rounded lower edge is pivoted to the common hinge pin 28 between the tong arms 24 and 26 to limit the uppermost position possible for the glass sheet G within the tongs. Further details of this feature and the benefits thereof are found in U.S. Pat. No. 2,991,114 to Robinson, the description of which is incorporated herein by reference. The bottom portion of tong arm 24 comprises a horizontal extension portion 30 constructed to terminate in a vertically apertured end portion 32. Similarly, the bottom portion of tong arm 26 comprises a horizontal extension portion 34 that is constructed to terminate in a vertically apertured end portion 36.

A vertical pin 38 is received within end portion 32. Pin 38 is diametrically apertured with an upper aperture (not shown) for alignment with a pair of diametrically aligned, horizontal apertures 40 in end portion 32 and a lower aperture (not shown) whose use will be described later. Thus, pin 38 is fixed to end portion 32 by a cotter key (not shown) extending through the aligned apertures 40 and the upper aperture of pin 38. A diametrically apertured vertical pin 42 of similar construction to pin 38 is secured to the end portion 36 by means of a cotter key (not shown) extending through horizontally aligned apertures 44 of end portion 36 and the upper aperture of vertical pin 42 in a similar manner to that by which pin 38 is secured to end portion 32. Each pin 38 and 42 has an enlarged lower portion 45.

An apertured sleeve 46 is concentrically mounted about pin 38 below the extension portion 30 and is provided with diametrically aligned apertures 47. Similarly, another apertured sleeve 48 is likewise mounted about pin 42 below the extension portion 34 and is provided with similar diametrically aligned apertures 49.

An apertured element 50 having a smoothly surfaced periphery of modified disc-like configuration is attached to the bottom of sleeve 46. Similarly, an identical element 51, also of modified disc-like configuration, is attached to the bottom of sleeve 48.

A cotter pin (not shown) is adapted to extend through the horizontally aligned apertures 47 of sleeve 46 and through the lower aperture of the vertical pin 38 and a similar cotter pin (not shown) is adapted to extend through the horizontally aligned apertures 49 of sleeve 48 and through the lower aperture of the vertical pin 42 to secure the respective sleeve 46 and 48 in desired orientation relative to the vertical pins 38 and 42.

The elements 50 and 51 are mounted with respect to the supporting sleeves 46 and 48 in such a manner that they are provided with diametrically opposite, convexly curved peripheral portions interconnected by straight sides. The periphery of the glass engaging elements 50 and 51 has front and rear segments missing from each circular disc element typical of the Hay patent mentioned in the statement of the prior art earlier in this specification, thereby providing the glass engaging element with a short dimension in the direction of the path defined by the roller conveyor R. The cotter pins serve as means for supporting the glass engaging members 50 and 51 in one of two possible predetermined orientations relative to the tongs so that a convexly rounded peripheral portion of one of the glass engaging elements opposes a convexly rounded peripheral portion of the other of the glass engaging elements to engage a gripped glass sheet therebetween. The flat missing peripheral portions defining the ends of the short dimension of the glass engaging elements 50 and 51 are out of contact with the gripped glass sheet.

The modification of the disc-shaped configuration of the glass engaging elements of prior art tongs to the presently described configuration lessens the length of the glass engaging elements in the direction of the path of glass sheet movement defined by the roller conveyor R by having its front end and its rear end segments missing from the prior art disc-shaped glass engaging elements. This modification in configuration makes it easier to align the smaller dimension of the glass engaging elements with smaller notched portions provided on press bending molds for shaping thin glass sheets. In molds prior to the present invention, the minimum length of said notched portions on shaping plates of press bending molds had to be sufficiently longer than the length of said glass engaging elements to allow room for the tong swinging that resulted from the rapid acceleration and stopping of the tong support carriage en route to the shaping station. Such large notched portions could be tolerated when press bending glass sheets having nominal thickness of at least 3/16 inch (4.8 millimeters). However, when customer requirements began to demand shaped and tempered glass sheets of lesser nominal thickness (4.5 millimeters and less), the size of the notched portions became a critical factor in controlling the shape of the glass sheet portions facing said notched portions. The systems for supporting at least one glass sheet gripping tong to be described in detail in the next portion of the specification makes it possible to use notched portions only slightly longer than the reduced length of the glass engaging elements with little or no fear of tong or mold damage due to misalignment of tongs relative to the notched portions.

TONG SUPPORT SYSTEM

FIGS. 2-6 illustrate a tong support system for supporting a large elongated glass sheet for a press bending operation. In FIG. 6, six tongs T are used to grip the glass sheet along its top edge. Two of the tongs T, those supporting the glass adjacent its longitudinal extremities, are freely suspended, while the other four tongs T are rigidly supported provided with limited freedom to swing in the direction of the path of glass sheet movement defined by the roller-type conveyor R.

Each of the extreme tongs T has its vertical connecting rod 11 attached to a saddle-like member 52 that is received in one of a series of notches 53 formed along the length of the upper edge portion of an upper pivotal support bar 54. The latter is pivoted about a pivot 55. The pivot 55 is carried by a housing that is rigidly attached to a vertically-extending upper pivot support rod 56. The latter, in turn, is externally threaded along its upper portion to be adjustably received in an aperture contained in a horizontal carriage bar 57. The horizontal carriage bar 57 is connected to a carriage rail 58 in spaced relation thereover by a pair of carriage connecting elements 59. The carriage rail 58 rides on the rolls of the roller type conveyor R.

Another vertically extending upper limit means support rod 60 has a threaded upper portion that is attached to the horizontal carriage bar 57 in the same manner as the upper pivot support rod 56. Both of the vertically extending rods 56 and 60 have adjustment nuts and washers disposed both above and below the horizontal carriage bar 57 to fix and adjust the vertical position of the rods relative to the bar 57. The upper limit means support bar 60 is attached at its lower end to a first limiting device 61. The latter is provided with a lower stop 62 in the form of a pin extending across the open housing of the limiting device 61 and an upper stop 63 extending in spaced relation above the lower stop 62 across the housing that forms the first limiting device 61. The upper pivotal support bar 54 extends through the housing that forms the first limiting device 61 and is restrained from downward movement by the lower stop 62 and restrained from upward movement by the upper stop 63. The stops 62 and 63 are spaced from one another a distance slightly greater than the vertical dimension of the upper pivotable support bar 54 when the latter occupies a horizontal orientation.

A second limiting device in the form of a housing 64 is rigidly attached to the upper pivotable support bar 54 inward of its pivot 55. At the innermost extremity of the upper pivotable support bar 54, a vertically extending lower pivot support bar 66 is attached. The latter is bifurcated at its lower end portion to receive a lower pivot 68. A lower pivot bar 70 is pivotally attached to the lower pivot 68 at the approximate central point thereof. An apertured housing 72 that receives the upper end of the vertically extending connecting rod 11 of tongs T is rigidly attached to each end of the lower pivot bar 70 by attachment braces 74. The housing that forms the second limiting device 64 is bifurcated at its lower end to receive a lower stop 75 in the form of a rod extending across the bifurcated portion and an upper stop 76 in the form of a rod which extends across the upper part of the bifurcated portion. Stop 75 is disposed below the outer portion of the lower pivot bar 70 and upper stop 76 is disposed above the lower pivot bar 70. The distance between the upper stop 76 and the lower stop 75 is slightly greater than the vertical dimension of the lower pivot bar 70 when the latter occupies a horizontal orientation.

Figure 2:
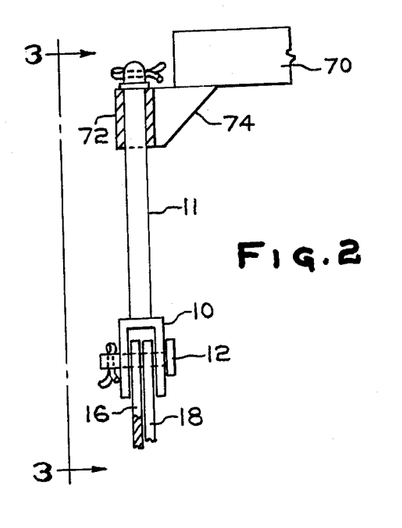
FIG. 2 is an enlarged fragmentary view taken at right angle to the view of FIG. 1, showing how the tongs of FIG. 1 are suspended from a tong support carriage to provide limited freedom for swinging in the direction of the path of glass sheet movement when the carriage is started or stopped suddenly during a press bending operation.
Figure 3:
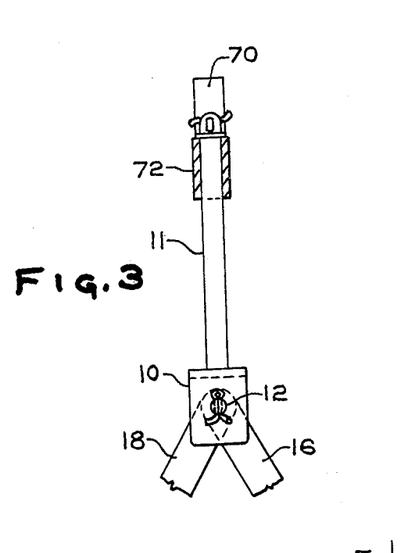
FIG. 3 is a fragmentary view normal to FIG. 2 showing the tongs of FIG. 1 and further illustrating its manner of support relative to the tong support carriage.

FIGS. 2 and 3 show in greater detail a manner of attaching the rigidly supported tongs T by supporting the upper portions of their vertically extending connecting rod 11 to apertured housing 72 whose inner diameter is substantially equal to the outer diameter to the vertically extending connecting rod 11 through a rigid connection by attachment braces 74 to the lower pivot bar 70. It is understood that in the event small glass sheets are being processed that a single tong T could be rigidly supported for each glass sheet directly from a rigid attachment to the horizontal carriage bar 57 in the manner of attaching the support rods 56 and 60. The vertical rods 56 and 60, the housings 61 and 64, the bars 54 and 70 and the rigid connections between the vertically extending support rods 11 and the apertured housings 72 represent means to support the tongs T by the carriage C. The stops 62 and 63 in the housings 61 and the stops 75 and 76 in housings 64 provide means to restrict the pivoting of said tongs relative to the path of movement defined by the roller conveyor R.

Figure 4:
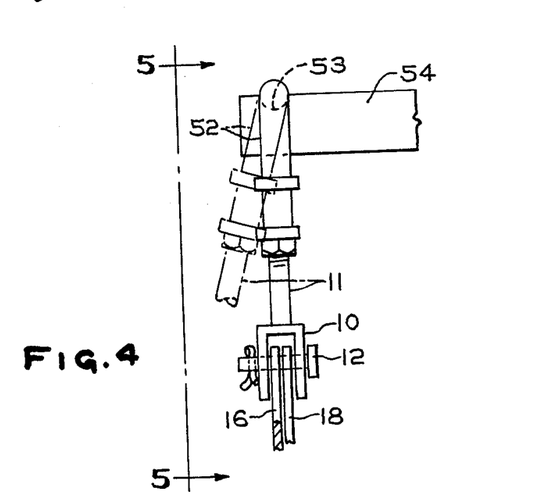
FIG. 4 is a fragmentary view similar to FIG. 2 showing an alternate manner of supporting tongs for free pivoting relative to a structural element of a tong supporting carriage.
Figure 5:
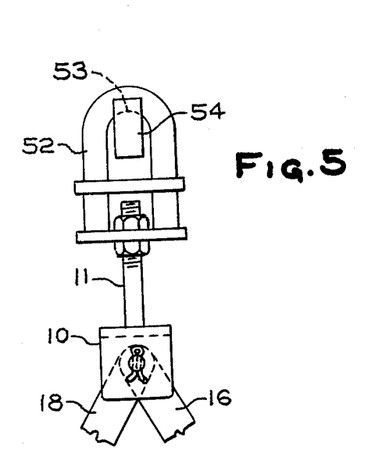
FIG. 5 is a view similar to FIG. 3 showing the alternate system for supporting a tong in a freely pivoting relation.

FIGS. 4 and 5 show how freely-hung tongs T, such as the exterior tongs T of the system of tongs depicted in FIG. 6, are supported for free suspension in mutually perpendicular directions. It is understood, however, that if the glass sheet were supported exclusively by tongs T in the manner depicted in FIGS. 4 and 5 that the sudden starting and stopping of the carriage C during the passage of the glass sheet to be processed by heating followed by press bending followed by cooling would cause the tongs T to swing in the manner depicted for the swinging of the upper portion of the vertically extending connecting rod 11 from the vertical position depicted in solid lines to the oblique position depicted in phantom. It is readily understood that such pivoting would cause considerable horizontal displacement of the glass engaging elements 50 and 51 of the various tongs and thus would require relatively elongated aligned slot openings in the press-bending apparatus B for avoiding damage to either the tongs or the press faces. This detail of the invention will be better understood in the light of a description of press-bending apparatus with which the present invention is designed to be used that follows.

PRESS BENDING APPARATUS

The glass bending apparatus shown in the drawings is based on that shown in U.S. Pat. No. 3,367,764 to Seymour. The details of the construction and operation of such an apparatus can be obtained from the patent, the disclosure of which is hereby incorporated by reference. Therefore, only a brief outline of that disclosure sufficient to understand the present invention is described in this specification.

Figure 7:
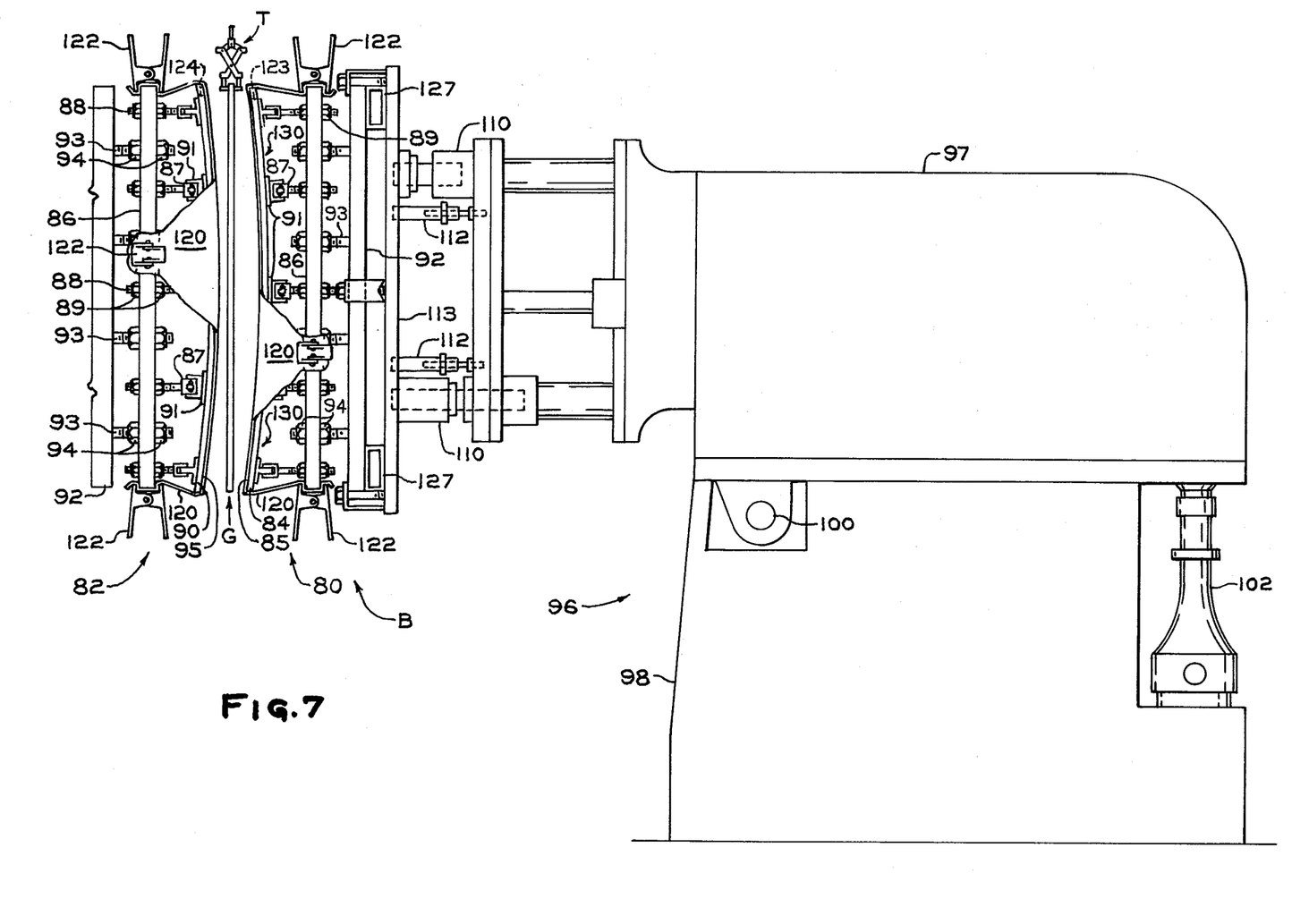
FIG. 7 is a fragmentary end view of a typical vertical press bending apparatus showing the relation of a pair of aligned curved surfaces of shaping plates of a pair shaping molds of complementary configuration relative to glass engaging elements of glass sheet gripping tongs when the latter are used according to the present invention.
Figure 8:
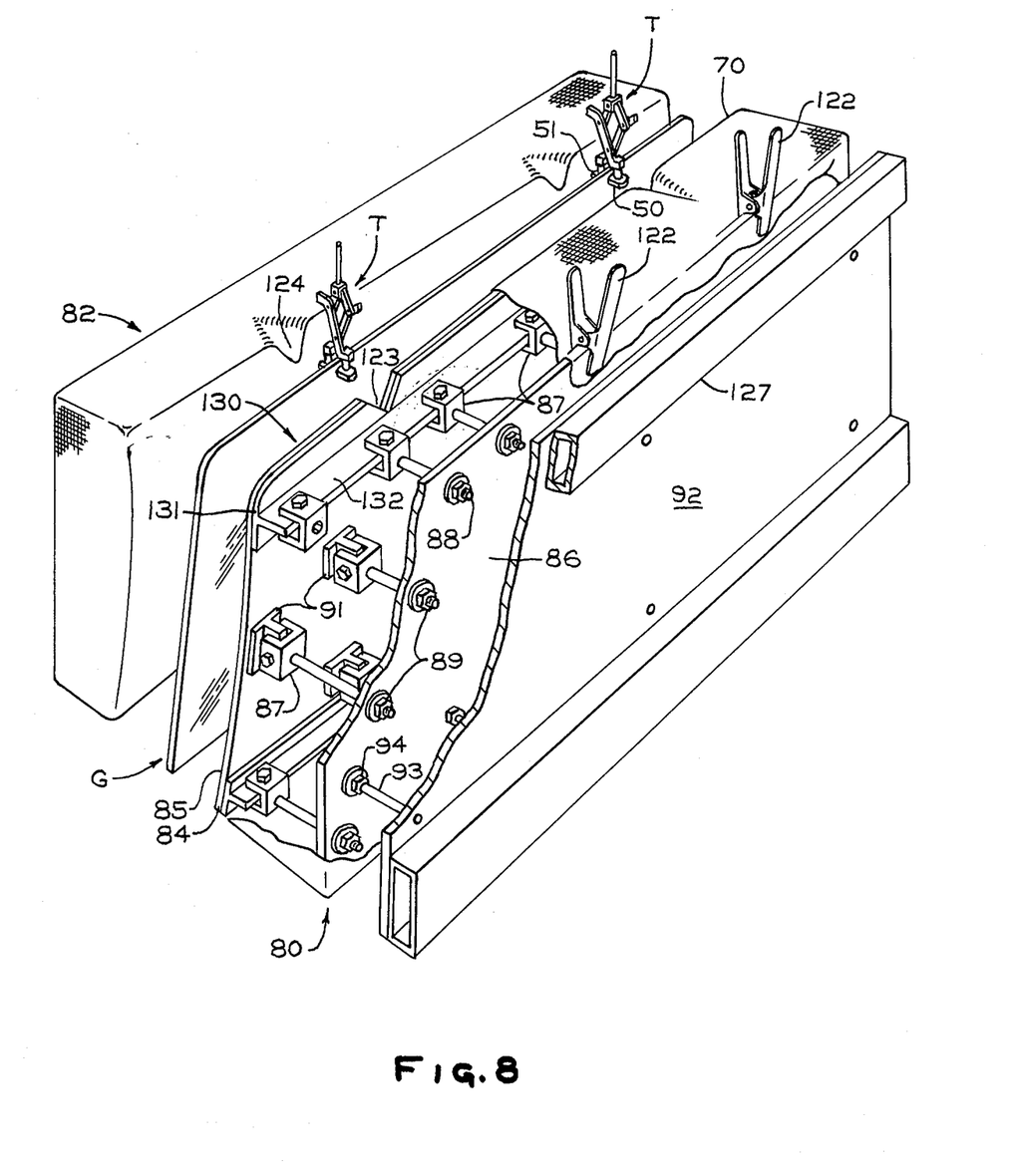
FIG. 8 is a perspective view of a pair of press bending molds for shaping glass sheets to a different configuration from that depicted in FIG. 6, showing an alternate outline shape for the notched portions of the shaping plates of said press bending molds that is made possible due to the use of the tong suspension system of the present invention.

As shown in FIGS. 7 and 8, the press bending apparatus comprises a concave shaping mold 80 and a convex shaping mold 82. The concave shaping mold 80 is comprised of a relatively flexible shaping plate 84 having a concave shaping surface 85. Disposed behind the shaping plate 84 is a relatively rigid adjusting plate 86.

Adjustable connecting means between shaping plate 84 and adjusting plate 86 are provided by an array of connectors. Each connector comprises a threaded shaft 88 (only a representative number being shown in the drawings for the sake of clarity) attached to adjusting plate 86 with nuts 89 and to shaping plate 84 by means of a clevis 87 and a T-shaped member 91. By manipulating nuts 89, the distance between each portion of shaping plate 84 and the corresponding portion of rigid adjusting plate 86 interconnected by each connector can be varied, thereby changing the curvature of shaping surface 85. The rigid adjusting plate 86 is, in turn, fastened to a flat, rigid back plate 92 by means of a plurality of threaded rods 93 and nuts 94 (again, only a representative number are shown). The connections between the shaping plate and the adjusting plate generally outnumber the connections between the adjusting plate and the back plate. For press bending apparatus constructed and arranged to handle relatively large glass sheets, the adjusting plate 86 may be segmented.

The convex shaping mold 82 comprises a relatively flexible shaping plate 90 having a convex shaping surface 95 complementary to that of the concave shaping surface 85. The convex shaping mold includes a rigid adjusting plate 86, a more rigid back plate 92, and adjustable attachment means corresponding to those of the concave shaping member 80, as indicated by like numerals in the drawings. The shaping surfaces 85 and 95 are correlated with the shape to be applied to the treated glass sheets as is appreciated by those skilled in the art.

Reciprocating motion is imparted to both the concave and convex shaping members 80 and 82 by a ram mechanism 96 engaging the back of each shaping member (only one of which is shown in FIG. 1). Each ram mechanism includes a housing 97 which may be driven along a generally horizontal line on a stationary base 98. Slight angularity may be imparted to the reciprocation of the ram by means of a pivot 100 and a piston 102 that is oriented in an approximately vertical orientation. Interposed between the ram housing 97 and the respective shaping mold are impact absorbing means 110 and return springs 112. Each back plate 92 is removably clamped onto a frame member 113 on the ram mechanism.

Each shaping member is provided with a cover 120 in direct contact with shaping surface 85 or 95. The cover 120 is preferably of a material which does not harm glass at elevated temperatures. Preferably, the material for the cover is stretchable fiber glass cloth composed of texturized yarn of the type depicted in U.S. Pat. No. 3,148,968 to Cypher and Valchar. A number of closely spaced clamps 122 grip the periphery of adjusting plate 86 to clamp the cover 120 in place. Portions of cover 120 are shown broken away in FIG. 7 to reveal details of the plate connecting means, and in FIG. 8 only part of the cover is shown also.

Shaping plate 84 has a series of notched portions 123 along its upper edge and shaping plate 90 has corresponding notched portions 124 aligned with the notched portions 123. A sheet of heat-softened glass G suspended from one or more tongs T is conveyed into position between the shaping molds while the latter are separated from one another a distance sufficient to permit clearance for the glass sheet therebetween. The shaping molds are then pressed together to bend the glass to a shape correlated with the shaping surfaces 85 and 95. The tongs T are stopped rapidly with their glass engaging elements 50 and 51 received in the respective notched portions 123 and 124 when the shaping molds are brought together to engage the opposite surfaces of the glass sheet to bend the latter. When the shaping molds separate again, the bent sheet of glass is conveyed away from the bending station while the tongs maintain the glass sheets in gripped relation between the glass engaging elements 50 and 51.

It can be readily understood that if the tongs T are permitted to swing freely as a result of the sudden starting and sudden stopping of the glass sheets G during a press bending operation, extremely long notched portions 123 and 124 would be required to avoid damage to the glass engaging elements 50 and 51 and the shaping plates 84 and 90. The means for limiting tong swing as the press bending molds 80 and 82 close will be described after the description of the other structural elements of the press bending apparatus B is completed.

It should be understood that the shaping molds depicted in FIGS. 7 and 8 are adapted for being provided with compound bends, that is, bends about axes angularly disposed relative to one another. However, the present invention is especially useful with press bending apparatus constructed and arranged to produce a cylindrical bend, that is, a curve about one axis of bending only. It should also be apparent that the present invention is not limited to the vertical mode of press bending but can also be applied to bending operations where the sheets of glass are held in an off from vertical orientation such as an oblique orientation.

The terms "flexible" and "rigid" used herein to describe the plates which form the shaping molds are, of course, relative terms and are intended merely to connote the stiffness of one plate relative to the stiffness of the other plates. In a typical glass bending apparatus, ¼ inch (6.35 millimeters) thick hot rolled steel, for example, may be considered flexible in comparison with ½inch (12.7 millimeters) thick cold rolled No. 1018 carbon steel, which in turn may be considered rigid. Extra rigidity may be imparted to back plate 92 by providing the latter with reinforcing braces such as tubular members 127. The "flexible" shaping plates 84 and 90 are considerably more rigid than the heat-softened glass sheets that are shaped by engagement therebetween. Hence, the flexible shaping plates tend to maintain their adjusted shape when engaging a heat-softened glass sheet to shape the latter.

The apparatus previously described may incorporate edge reinforcing means 130 attached to the reverse surface of each of the relatively flexible shaping plates 84 and 90. In a preferred embodiment of the press bending apparatus, the edge reinforcing means is a longitudinally extending reinforcement bar of T section that extends substantially the entire length of the upper edge portion of shaping plate 84 that includes notches 123, and comprises a base or head 131 and a stem 132. A similar reinforcing means is attached in similar location to the reverse surface of flexible shaping plate 90 of convex shaping mold 82. The reinforcing means extends longitudinally in a direction substantially aligned with an axis of bending defined by the shaping plates 84 and 90, which, in the specific embodiment illustrated in FIGS. 7 and 8, extends in a horizontal direction. If desired, an additional edge reinforcing means 130 may be connected along the lower edge portion of the reverse surface of each shaping plate opposite the edge portion of be notched.

In fabricating press bending molds used with tongs and tong supporting elements conforming to the present invention, the shaping plates 84 and 90 can be pressed to the approximate shape desired between a pair of heavy die members. Then, the edge reinforcing means 130 in the form of a reinforcement bar of T section having a length substantially equal to the length of the flexible shaping plate 84 or 90 is spot welded to the reverse surface of the shaping plate with one of the longitudinally extending side edges of its head or base 131 aligned with the longitudinally extending edge of the shaping plate, and its stem 132 extending away from the reverse surface of the shaping plate. The shaping plates and the portion of each head or base 131 extending to the edge side of the shaping plate from the stem 132 are then cut to provide a series of notched portions 123 or 124 in positions required to receive glass supporting tongs therein when the glass engaging surfaces 85 and 95 close against the opposite major surfaces of a heat-softened glass sheet.

The length of the notched portions 123 and 124 along the upper edges of the respective shaping plates 84 and 90 and their reinforcements 130 in the direction of the path of glass sheet movement defined by the roller type conveyor R is very important, particularly when shaping thin glass sheets. Prior to the present invention, the length of notched portions along the length of the upper edge of the flexible shaping plates could be extended to several inches for handling thicker glass sheets (minimum nominal thickness of 3/16 inch or 4.8 millimeters) without introducing distortion beyond the amount tolerated by customers in the upper edge portions of the thicker glass sheets. However, when thinner heat-softened glass sheets having a maximum nominal thickness of 5/31 inch (4 millimeters) were shaped by press bending, the glass sheets developed kinks and wrinkles in their upper edge portions that were aligned with notched portions of the shaping plates during press bending.

Reducing the size of the notched portions 123 and 124 was considered necessary to reduce the deviation of the press bent glass sheets of lesser thickness in the vicinity of the notched portions for receiving tongs. However, reducing the length of the upper notched portions in an amount sufficient to provide sufficient resistance of the thinner glass sheets to distortion along their upper edge portions introduced considerable damage to tongs and to the flexible shaping plates whenever all the tongs were suspended for free pivoted swinging as depicted in FIG. 4 and 5 and swung into positions of misalignment with the notched portions as the press bending molds closed. However, by suspending at least one tong supporting a glass sheet in the manner depicted in FIGS. 2 and 3, and by limiting the maximum length permitted for a notched portion (or tong slot) to the following formula: $S = L + 6t$, where S is the length of tong slot in the direction of the path of glass sheet movement, L is the length of the glass engaging element in the direction of the path of glass sheet movement, and $t$ is the thickness of the glass sheets undergoing press bending, that a tong support system containing at least one tong constrained from free swinging, as depicted in FIGS. 2 and 3 was able to produce press bent glass sheets of suitable shape within tolerances acceptable to the customer including their upper edge portions that faced the notched portions of limited length when the length of the glass engaging elements L did not exceed ½ inch (12.7 millimeters).

The glass engaging elements 50 and 51 of the tongs T used with the tong support system of the present invention are preferably of the nonpointed type such as modified discs having convexly rounded glass engaging edge portions and front and rear segments removed to provide a maximum length L of ½ inch (12.7 millimeters) and a permissible range of lengths of ¼ inch to ½ inch (6.4 millimeters to 12.7 millimeters). Under such constraints, the maximum length S suitable for the notched portions 123 and 124 is 1¼ inch (31.8 millimeters) for press bending glass sheets of ⅛ inch (3.1 millimeters) nominal thickness and 1½ inch (37 millimeters) for press bending glass sheets of 5/32 inch (4 millimeters) nominal thickness.

A comparison of the notched portions of FIG. 6 with those of FIG. 8 indicates that the shape of the notch may be rectangular as in FIG. 6 or V-shaped as in FIG. 8. It is also noted in passing that the shape of the notched portions may be any convenient shape provided that the size and configuration of opposed notched portions are substantially identical. V-shaped notches of the type shown in FIG. 8 are preferred for press bending molds for processing thinner glass sheets (4 millimeters and less).

It can be appreciated from the previous description that at least a single tong that is supported in such a manner as to restrict its free swinging must be included in a system of tongs for supporting a glass sheet for press bending. For supporting a small glass sheet, a single tong so restricted is sufficient. For larger glass sheets requiring more than one tong for glass sheet support, it is required that at least one tong be supported in the swing-restricting manner depicted in FIGS. 2 and 3 while the remaining tongs may be supported either in free swinging relation to the tong supporting carriage C or in swing-restricting relation thereto. If the remaining tongs are supported in a freely swinging relation to the carriage, the rigidity of the glass sheet in the direction of its path of movement is relied upon to keep the freely suspended tongs from swinging relative to the restricted tong or tongs that are mounted for restricted pivotal movement in the direction of the path of glass sheet movement during the press bending operation.

The form of the invention shown and described in this disclosure represents an illustrative preferred embodiment and certain modifications thereof. It is understood that various changes may be made without departing from the gist of the invention as defined by the claimed subject matter which follows.

I claim:

1. Apparatus for press bending glass sheets, comprising:
   a furnace for heating glass sheets to a softened condition;
   conveyor means extending horizontally from the furnace over a bending position in a longitudinal direction defining a direction of glass travel;
   a pair of opposed complementary bending molds mounted for reciprocation in a direction transverse to the direction of glass travel toward opposite sides of said bending position so as to bend a vertically suspended glass sheet therebetween;
   a carriage adapted for movement by the conveyor means in the direction of glass travel;
   first pivot means supported by the carriage with essentially no freedom of motion in the direction of glass travel relative to the carriage;
   a first pivot bar rotatably affixed to the carriage by way of said pivot means so as to permit rotation of the bar in a vertical plane parallel to the direction of glass travel;
   stop means carried by the carriage for limiting the rotation of the pivot bar to a small angle from horizontal; and
   a set of glass-gripping tongs affixed to each end of the pivot bar so as to swing freely in transverse planes with essentially no freedom to oscillate in the longitudinal direction of glass travel.

2. The apparatus of claim 1 wherein said pivot bar is free to rotate to a limited degree about a vertical axis.

3. The apparatus of claim 1, further including a third set of glass gripping tongs supported from the carriage in free swinging relation thereto.

4. The apparatus of claim 3, further including second pivot means rigidly supported by the carriage, a second pivot bar affixed to the second pivot means so as to permit rotation of the second pivot bar in a vertical plane parallel to the direction of glass travel, and second stop means carried by the carriage for limiting the degree of rotation of the second pivot bar to a few degrees from horizontal, said third set of tongs and said first pivot means being carried by opposite ends of the second pivot bar.

5. The apparatus of claim 4 wherein the second pivot bar is free to rotate to a limited degree about a vertical axis.

* * * * *

UNITED STATES PATENT AND TRADEMARK OFFICE
CERTIFICATE OF CORRECTION

PATENT NO. : 4,104,047
DATED : August 1, 1978
INVENTOR(S) : Samuel L. Seymour

It is certified that error appears in the above-identified patent and that said Letters Patent are hereby corrected as shown below:

Column 2, line 54, "additiona," should be --addition,--.

Column 9, line 51, "glassengaging" should be --glass-engaging--.

Column 10, line 56, please insert --a-- after "cover is".

Column 13, line 15, "1-1/2" should be --1-1/4--.

Signed and Sealed this

Thirteenth Day of March 1979

[SEAL]

Attest:

RUTH C. MASON
Attesting Officer

DONALD W. BANNER
Commissioner of Patents and Trademarks